(12) United States Patent
Abdi Taghi Abad et al.

(10) Patent No.: US 11,748,512 B2
(45) Date of Patent: *Sep. 5, 2023

(54) PROTECTING CLIENT PERSONAL DATA FROM CUSTOMER SERVICE AGENTS

(71) Applicant: Capital One Services, LLC, McLean, VA (US)

(72) Inventors: Fardin Abdi Taghi Abad, Champaign, IL (US); Austin Grant Walters, Savoy, IL (US); Jeremy Edward Goodsitt, Champaign, IL (US); Reza Farivar, Champaign, IL (US); Vincent Pham, Champaign, IL (US); Mark Louis Watson, Sedona, AZ (US); Kenneth Taylor, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/307,221

(22) Filed: May 4, 2021

(65) Prior Publication Data

US 2021/0256158 A1    Aug. 19, 2021

Related U.S. Application Data

(63) Continuation of application No. 16/596,706, filed on Oct. 8, 2019, now Pat. No. 11,023,614, which is a
(Continued)

(51) Int. Cl.
*G06F 21/62* (2013.01)
*H04L 9/32* (2006.01)
(Continued)

(52) U.S. Cl.
CPC ........ *G06F 21/6245* (2013.01); *G06F 16/907* (2019.01); *G06F 21/31* (2013.01);
(Continued)

(58) Field of Classification Search
CPC .... G06F 21/6245; G06F 16/907; G06F 21/31; G06F 21/32; G10L 15/08; G10L 15/26;
(Continued)

(56) References Cited

U.S. PATENT DOCUMENTS 9,639,569 B2 * 5/2017 Mattsson ................ H04L 63/00
10,380,380 B1 * 8/2019 Abdi Taghi Abad .........................
G06F 16/907
(Continued)

*Primary Examiner* — Hosuk Song
(74) *Attorney, Agent, or Firm* — KDW Firm PLLC

(57) ABSTRACT

Techniques for providing a real-time service that protects personal data of clients from customer service agents are provided. Customer data that includes personal data indicative of sensitive information of a customer can be received from the customer. The personal data within the received customer data can be detected and a token that does not include the sensitive information of the customer can be generated. The personal data and the generated token can be stored along with data indicating a relationship between the token and the personal data. The personal data in the received customer data can be replaced by the token to form modified customer data. The modified customer data can be provided to a customer service representative. The token within the modified customer data can later be detected and associated with the personal data without revealing the personal data to the customer service representative.

20 Claims, 10 Drawing Sheets

Related U.S. Application Data continuation of application No. 16/154,663, filed on Oct. 8, 2018, now Pat. No. 10,482,281, which is a continuation of application No. 16/154,581, filed on Oct. 8, 2018, now Pat. No. 10,380,380.

(51) Int. Cl.
| | |
|---|---|
| *G06F 21/31* | (2013.01) |
| *G10L 15/08* | (2006.01) |
| *H04M 3/22* | (2006.01) |
| *G06F 16/907* | (2019.01) |
| *G10L 15/26* | (2006.01) |

(52) U.S. Cl.
CPC ............ *G10L 15/08* (2013.01); *H04L 9/3213* (2013.01); *H04L 9/3226* (2013.01); *H04M 3/2281* (2013.01); *G10L 15/26* (2013.01); *H04L 2209/42* (2013.01); *H04M 2203/6009* (2013.01)

(58) Field of Classification Search
CPC . H04L 9/3213; H04L 9/3226; H04L 2209/42; H04M 2203/6009; H04M 3/2281
See application file for complete search history.

(56) References Cited

U.S. PATENT DOCUMENTS

| | | | | |
|---|---|---|---|---|
| 10,482,281 | B1 * | 11/2019 | Abdi Taghi Abad | ........................ H04L 9/3226 |
| 10,498,772 | B2 * | 12/2019 | Adhar | ................... H04L 63/105 |
| 10,803,197 | B1 * | 10/2020 | Liao | .................... G06F 21/604 |
| 10,956,591 | B1 * | 3/2021 | Joshi | ................... G06F 21/6245 |
| 11,023,614 | B2 * | 6/2021 | Abdi Taghi Abad | ........................ H04L 9/3226 |
| 11,074,366 | B2 * | 7/2021 | Cheng | ................ G06F 21/6245 |
| 11,216,587 | B2 * | 1/2022 | Bragdon | ............. G06F 21/6245 |
| 11,263,335 | B2 * | 3/2022 | Parthasarathy | ... G06F 16/24578 |
| 11,374,754 | B2 * | 6/2022 | Wang | ................... H04L 9/3247 |

* cited by examiner

PROTECTING CLIENT PERSONAL DATA FROM CUSTOMER SERVICE AGENTS

RELATED APPLICATIONS

This application is a Continuation of U.S. patent application Ser. No. 16/596,706, filed on Oct. 8, 2019, which is a Continuation of U.S. patent application Ser. No. 16/154,663, filed on Oct. 8, 2018 (issued as U.S. Pat. No. 10,482,281 on Nov. 19, 2019), which is a Continuation of U.S. patent application Ser. No. 16/154,581, filed on Oct. 8, 2018 (issued as U.S. Pat. No. 10,380,380 on Aug. 13, 2019). The contents of all the aforementioned patent applications are incorporated herein by reference in their entireties.

TECHNICAL FIELD

Embodiments described herein generally relate to protection of a customer's sensitive personal information.

BACKGROUND

When interacting with a conventional customer service provider, a customer often speaks to a customer service agent or representative over a voice call or through an online chat service session. During these interactions, the customer service agent is privy to any personal information the customer may be required to provide such as, for example, a Social Security number or sensitive medical information. Such conventional approaches to obtaining sensitive personal information from the customer leaves the sensitive personal information unprotected and vulnerable to use or other exploitation by a rouge or otherwise corrupt customer service representative.

Accordingly, there is a need to protect a customer's sensitive personal information that the customer may be required to provide when interacting with a customer service representative.

DETAILED DESCRIPTION

This disclosure presents various systems, components, and methods related to protecting sensitive personal information of a user when interacting with a customer service representative. Each of the systems, components, and methods disclosed herein provides one or more advantages over conventional systems, components, and methods.

Various embodiments include techniques for providing a real-time service that protects personal data of clients from customer service agents. Customer data that includes personal data indicative of sensitive information of a customer can be received from the customer. The personal data within the received customer data can be detected, and a token that does not include the sensitive information of the customer can be generated. The personal data and the generated token can be stored along with data indicating a relationship between the token and the personal data. The personal data in the received customer data can be replaced by the token to form modified customer data. The modified customer data can be provided to a customer service representative. The token within the modified customer data can later be detected and associated with the personal data without revealing the personal data to the customer service representative. Other embodiments are disclosed and described.

Various embodiments include techniques for protecting client data during customer service calls. During a customer service call, a customer can provide logon identification data through an application separate from the ongoing service call. The logon identification data can be used to verify the customer and/or to match data to be provided from the customer to the specific customer service call. A query for the customer can be provided as initiated by the customer service representative. The customer can provide responsive data that includes sensitive personal information. The responsive data can be provided through the separate application such that the customer service representative is not provided access to the sensitive personal information. The responsive data can be stored for later use, and an indication that the sensitive personal information has been received can be provided to the customer service representative. Other embodiments are disclosed and described.

Figure 1:
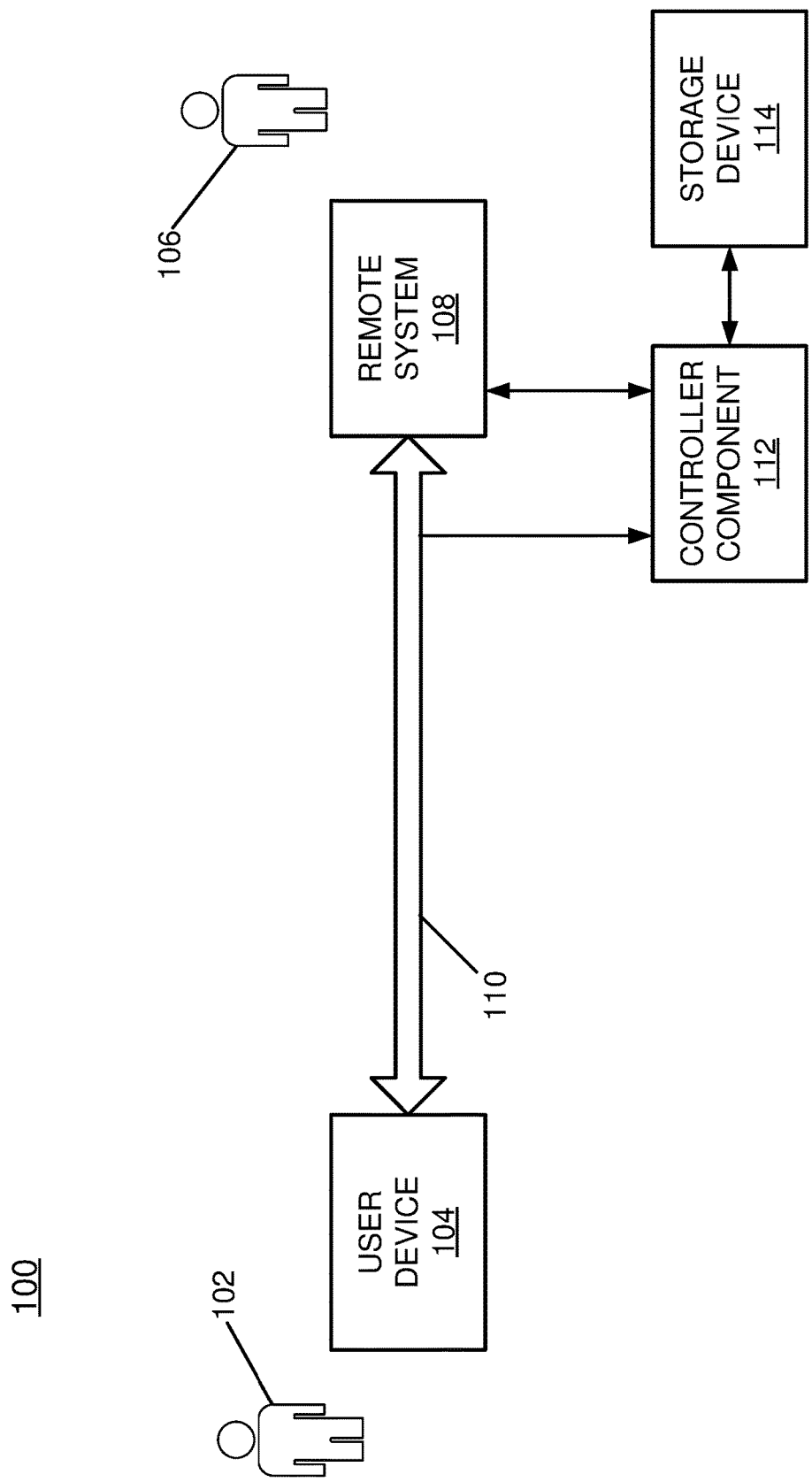
FIG. 1 illustrates a first operating environment.

FIG. 1 illustrates an operating environment 100 such as may be representative of various embodiments in which a real-time service for protecting personal data of individuals from customer service representatives may be implemented. The operating environment 100 can include a user or client 102 operating a user device 104 and a customer service agent or representative 106 operating a remote system 108. In various embodiments, the user device 104 can be any type of computing device including, for example, a desktop computer, a laptop computer, a tablet, a mobile computing device, or a smartphone. In various embodiments, the user device 104 can be a telephone (e.g., a landline telephone).

In various embodiments, the remote system 108 can include one or more computing devices, one or more servers, and/or one or more workstations. In various embodiments, the customer service representative 106 can operate a computing device communicatively coupled to the remote system 108. In various embodiments, the remote system 108 can include a telephone (e.g., a landline telephone).

In various embodiments, the user device 104 and the remote system 108 can communicate and/or share any data or information over a communication link 110. The data can be any type of data including voice data. The communication link 110 can comprise one more computer networks or links. The communication link 110 can include, for example, one or more wireless communication systems that operate according to one or more wireless communication standards or protocols over any frequency band or range. The communication link 110 can include, for example, one or more wired communication systems that operate according to one more wired communication standards or protocols over any type of wired media. The user device 104 and the remote system 108 can communicate according to any computer network protocol including any Internet-related communication protocol to facilitate the sharing of any type of data between the user device 104 and the remote system 108.

In various embodiments, the remote system 108 can host an online web service and/or any other service facilitating communication between the user device 104 and the remote system 108. The online service provided by the remote system 108 can be any type of website or application accessible over, for example, the Internet. The remote system 108 can respond to requests and/or inputs from the user 102 (e.g., as received by the remote system 108) to present the online service or any function provided by the online service to the user device 104.

In various embodiments, the remote system 108 can provide an online chat service that can be used by the user 102. The user device 104 can be, for example, a desktop computer that the user 102 can use to establish a chat session with the customer service representative 106 over the online chat service hosted and/or provided by the remote system 108. The remote system 108 can generate data for the online chat session for presentation on a display of the user device 104. The remote system 108 can receive data from the user device 104 such as, for example, data entered into the user device 104 by the user 102. In this way, textual data can be shared and/or exchanged between the user 102 and the customer service representative 106 using the user device 104 and the remote system 108, respectively.

In various embodiments, other types of data including voice and/or video data can be exchanged between the user device 104 and the remote system 108. In various embodiments, the user device 104 can be a telephone (e.g., a landline phone or a computing device providing voice communication capabilities and/or video chat capabilities) and the remote system 108 can provide voice communication capabilities—for example, the remote system 108 can also be a landline telephone or a computing device providing voice communication capabilities (and/or video chat capabilities). Under such a scenario, the user 102 and the customer service representative 106 can exchange information verbally through the exchange of voice data, video data, and/or audio data.

In various embodiments, the user 102 and the customer service representative 106 can establish communications through, for example, a chat session and/or through voice communications. Often, once communications are established, the customer service representative 106 requests sensitive personal information from the user 102. The sensitive personal information can be used to verify the user 102 and/or to collect additional information about the user 102 to help facilitate addressing an issue of the user 102 (e.g., a medical issue, a financial issue, etc.). The sensitive personal information can include many different types of information the user 102 may not feel comfortable sharing with the customer service representative 106 such as, for example, a Social Security number, a date of birth, financial information, or medical information.

In various embodiments, techniques disclosed herein can enable sensitive personal information provided by the user 102—for example, through a real-time conversation through a video or audio call or a chat service session—to be detected and stored without revealing the sensitive information to the customer service representative 106. The customer service representative 106 can be provided with an indication that the user 102 has provided the sensitive personal information—for example, in response to a query for the same from the customer service representative 106.

In various embodiments, the sensitive personal information can be replaced with a token or other replacement data that does not contain the sensitive personal information. The token can be presented to the customer service representative 106. The customer service representative 106 can enter the token into any data field on any type of user interface or application that the customer service representative 106 may interact with at any time the sensitive information is to be entered. The token can be entered and stored and linked to the stored sensitive personal information so that it may be used but not revealed (e.g., for display) to the customer service representative 106.

As shown in FIG. 1, the operating environment 100 can further include a controller component or module 112. The controller component 112 can be part of the remote system 108 or can be a separate computing device and/or located on a separate computer network. The controller component 112 can be implemented in software, hardware, or any combination thereof. The operating environment 100 can further include a storage device 114. The storage device 114 can be part of the controller component 112, part of the remote system 108, or can be a separate device and/or located on a separate computer network. The storage device 114 can be any type of memory storage device.

In various embodiments, during a real-time conversation between the user 102 and the customer service representative 106—for example, during a video and/or audio call or chat service session—the controller component 112 can detect sensitive personal information provided by the user 102. The sensitive personal information can be provided by the user 102 verbally (e.g., during a voice phone call or mechanism for sharing audio data between the user device 104 and the remote system 108) or through non-verbal data (e.g., textual data typed by the user 102 during a chat session provided by the remote system 108).

The controller component 112, after detecting the sensitive personal information, can store the sensitive personal information—for example, in the storage device 114. Further, the controller component 112 can generate a token or other replacement data for the sensitive personal information. The token or replacement data can operate as a replacement for the sensitive personal information. The controller component 112 can also store the token along with an indicator or other data for indicating or specifying the link or relationship between the sensitive personal information and the generated replacement token data.

The controller component 112, in various embodiments, can provide the generated token to the customer service representative 106. In various other embodiments, an indication that the sensitive personal information has been received and stored is provided to the customer service representative 106. In various embodiments, the generated token can be displayed to the customer service representative 106 on a display coupled to and/or associated with the remote system 108. By providing the token to the customer service representative 106, the sensitive personal information is never revealed or provided to the customer service representative 106.

In various embodiments, the customer service representative 106 can enter the token into one more data entry fields within a user interface or application provided by the remote system 108. For example, the customer service representative 106 may interact with a data collection application that stores data provided by the user 102 during a real-time conversation with the customer service representative 106 by relying on the customer service representative 106 to enter data as it is heard or seen by the customer service representative 106. Accordingly, the customer service representative 106 may enter the token into multiple data entry fields provided by the application to facilitate storage of the token. In this way, the customer service representative 106 never enters the sensitive personal information but instead the token. Later, when the sensitive personal information is needed to be retrieved, the stored token can be linked to the sensitive personal information based on the link stored earlier by the controller component 112.

In various embodiments, the sensitive personal information can be provided by the user 102 verbally, for example, during a phone call established between the user device 104 and the remote system 108. The controller component 112, in real-time or in near real-time, can detect the sensitive information within the voice data provided by the user device 104. In various embodiments, the controller component 112 can generate a replacement token that is also voice data. The replacement voice data can have a duration approximately equal to a duration of the verbalized sensitive personal information. The replacement voice data can then be provided within the verbal message from the user 102 for playback and/or presentation to the customer service representative 106. The customer service representative 106 can then hear in real-time or near real-time, the replacement voice data and not the sensitive personal information. In various embodiments, the replacement token data is provided to the customer service representative 106 visually only. The received voice data, and generated replacement voice data, can each be audio data.

In various embodiment, the sensitive personal information can be provided by the user 102 as data, for example, textual or other graphical data during a chat session established between the user device 104 and the remote system 108. The controller component 112, in real-time or in near real-time, can detect the sensitive information within the data provided by the user device 104. In various embodiments, the controller component 112 can generate a replacement token that is also data used by the chat session (e.g., textual data or graphical data). The replacement textual data can have a length approximately equal to a length of the textual sensitive personal information. The replacement textual data can then be provided within the textual message from the user 102 for presentation to the customer service representative 106. The customer service representative 106 can then see in real-time or near real-time, the replacement textual data and not the sensitive personal information.

In various embodiments, when the sensitive personal information needs to be retrieved, the remote system 108 and/or any other remote computing device coupled to the remote system 108 and/or the controller component 112, can query the controller component 112 for the sensitive personal information. As part of the query, a type or category of sensitive data (e.g., date of birth, Social Security number, etc.) can be provided and/or the token can be provided. Based on the stored link between the token and the sensitive personal information, the controller component 112 can retrieve the sensitive personal information from the storage device 114. The sensitive personal information can then be provided without revealing the sensitive personal information to a human operator. In various embodiments, the token and the sensitive personal information can be provided together for use.

The controller component 112 can employ a number of techniques to detect sensitive personal information provided through the communication link 110 from the user device 104. In various embodiments, the controller component 112 can implement text recognition techniques to recognize sensitive personal information in any chat session communication from the user device 104. In various embodiments, the controller component 112 can implement speech recognition techniques to recognize any sensitive personal information in any verbal or audible communication from the user device 104.

In various embodiments, the controller component 112 can implement machine learning techniques and/or can be part of a recurrent neural network (RNN) that can be trained to recognize sensitive personal information. In various embodiments, the controller component 112 can develop statistical models of the information shared between the user 102 and the customer service representative 106 through the user device 104 and the remote system 108, respectively. For example, the controller component 112 can assign a likelihood that each word or individual piece of data or information from the user 102 contains sensitive personal information. If the likelihood assigned to a particular spoken or typed word, for example, exceeds a threshold, the particular spoken or typed word can be flagged as containing sensitive personal information. The flagged word or information can then be selected for replacement using a token as described herein.

In various embodiments, conditional probabilities for assigning a likelihood that data from the user (e.g., textual data and/or voice data) contains sensitive personal information can be based on a question or other query from the customer service representative 106 and/or based on the format or data used in the response from the user 102. In other embodiments, sensitive personal information can be detected by comparison of any data from the user 102 to a keyword list.

Figure 2:
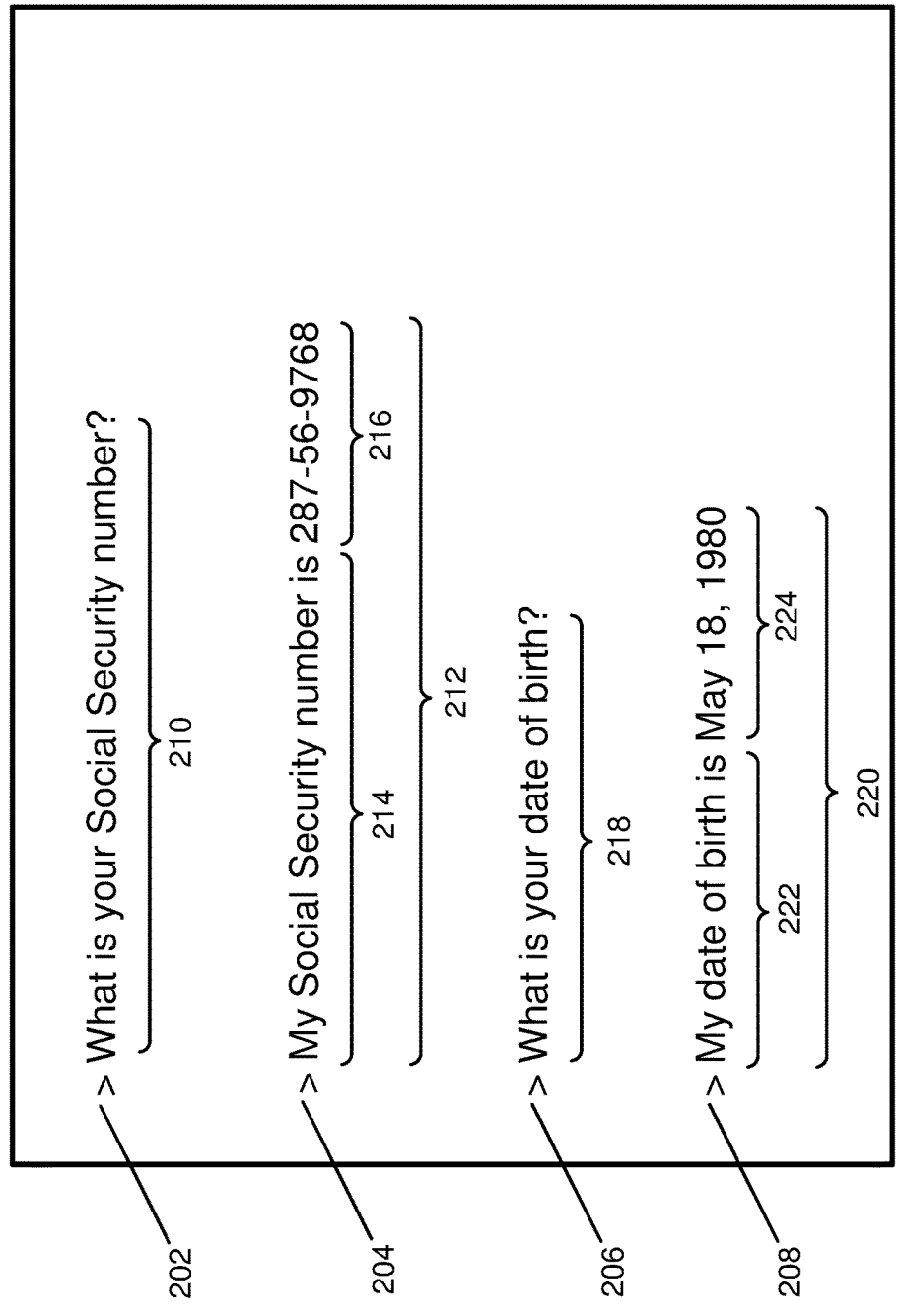
FIG. 2 illustrates a first display presented to a user depicted in FIG. 1.

FIG. 2 illustrates data or other information presented to the user 102 and/or data or other information provided by the user 102 during a real-time conversation 200 with the customer service representative 106. As an example, FIG. 2 can represent audible information exchanged between the user 102 and the customer service representative 106. As another example, FIG. 2 can represent exchanged messages during a chat session between the user 102 and the customer service representative 106. For purposes of discussion only, FIG. 2 will be described as containing textual data presented to the user 102 and/or provided by the user 102 during an online chat service session with the customer service representative 106.

Figure 3:
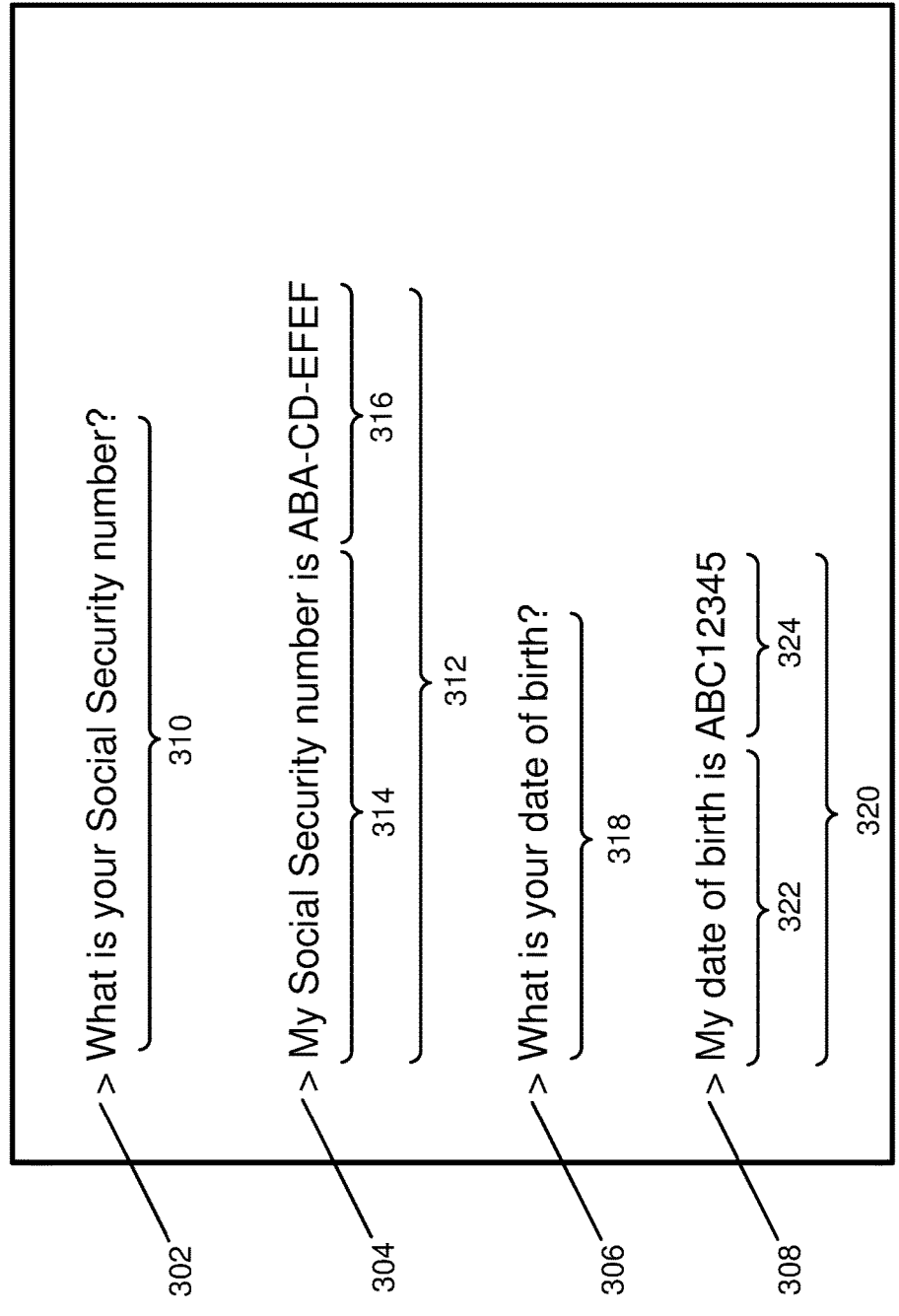
FIG. 3 illustrates a second display presented a customer service representative depicted in FIG. 1.

FIG. 3 illustrates data or other information presented to the customer service representative 106 and/or data or other information provided by the customer service representative 106 during a real-time conversation 300 with the user 102. FIG. 3 can correspond to the FIG. 2 in relation to information provided or presented to the customer service representative 106. As an example, FIG. 3 can represent audible information exchanged between the user 102 and the customer service representative 106. As another example, FIG. 2 can represent messages exchanged during a chat session between the user 102 and the customer service representative 106. For purposes of discussion only, FIG. 3 will be described as containing textual data presented to the customer service representative 106 and/or provided by the customer service representative 106 during an online chat service session with the user 102.

As shown in FIG. 3, at 302, the customer service representative 106 types a first question 310 for presentation to the user 102. Corresponding, at 202, the user 102 sees a representation 210 of the first question 310 from the customer service representative 106.

At 204 in FIG. 2, the user 102 can type a response. The response can be considered to be a customer message 212 or customer data message 212. The customer message 212 can include a first component 214 and a second component 216.

The first component 214 can represent innocuous information or information that does not include sensitive personal information. The second component 216 can include sensitive personal information. The customer message 212 can be typed by the user 102 and can be shown for display to the user 102 only. The customer message 212 can be sent to the customer service representative 106 through the online chat session.

At 304, the customer service representative 106 can be provided with a modified customer message 312. The modified customer message 312 can be a modified version of the customer message 212. The modified customer message 312 can include a first component 314 and a second component 316. The first component 314 can include non-sensitive or innocuous information and can correspond to the first component 214. The second component 316 can be a token or other replacement data that replaces the sensitive information 216. As shown, the modified customer message 312 provided to the customer service representative 106, for example on a display associated with the remote system 108, can be shown without including any portion of the sensitive information component 216 of the original message 212 from the user 102.

Receipt of the modified customer message 312 at 304 by the customer service representative 106 can indicate that the sensitive personal information requested by the customer service representative 106—as indicated by the query 310—has been provided and stored. The token component 316 of the modified customer message 312 can be used by the customer service representative 106. For example, the customer service representative 106 can enter the token component 316 as data into an application or another user interface for storing data related to the user 102. In this way, the sensitive information of the user 102 from component 216 is never revealed or provided to the customer service representative 106, thereby increasing the security of the personal information of the user 102.

As further shown in FIG. 3, at 306, the customer service representative 106 types a second question 318 for presentation to the user 102. Corresponding, at 206, the user 102 sees a representation 218 of the second question 318 from the customer service representative 106.

At 208 in FIG. 2, the user 102 can type a response. The response can be considered to be a customer message 220 or customer data message 220. The customer message 220 can be provided as a response to the question 218 from the customer service representative 106. The customer message 220 can include a first component 222 and a second component 224. The first component 222 can represent innocuous information or information that does not include sensitive personal information. The second component 224 can include sensitive personal information. The customer message 220 can be typed by the user 102 and can be shown for display to the user 102 only. The customer message 220 can be sent to the customer service representative 106 over the online chat session.

At 308, the customer service representative 106 can be provided with a modified customer message 320. The modified customer message 320 can be a modified version of the customer message 220. The modified customer message 320 can include a first component 322 and a second component 322. The first component 322 can include non-sensitive or innocuous information and can correspond to the first component 222. The second component 324 can be a token or other replacement data that replaces the sensitive information 224. As shown, the modified customer message 320 provided to the customer service representative 106, for example on a display associated with the remote system 108, can be shown without including any portion of the sensitive information component 224 of the original message 220 from the user 102.

Receipt of the modified customer message 320 at 308 by the customer service representative 106 can indicate that the sensitive personal information requested by the customer service representative 106—as indicated by the query 318—has been provided and stored. The token component 324 of the modified customer message 320 can be used by the customer service representative 106. For example, the customer service representative 106 can enter the token component 324 as data into an application or another user interface for storing data related to the user 102. In this way, the sensitive information of the user 102 from component 224 is never revealed or provided to the customer service representative 106, thereby increasing the security of the user 102.

The operations described in relation to FIGS. 2 and 3 can be implemented by the components depicted in FIG. 1. For example, the data or information from the conversation 200 from the perspective of the user 102 can be provided by the user device 104 and the data or information from the conversation 300 from the perspective of the customer service representative 106 can be provided by the remote system 108. The controller component 112 can first receive any messages provided by the user—for example, the messages 212 and 220. The messages 212 and 220 can be audio, voice, video, textual or any other type of data or any combination thereof. The controller component 112 can review each of the messages 212 and 220 to detect the inclusion of any sensitive information. The controller component 112 can determine the sensitive components of personal data 216 and 224 in each of the messages 212 and 220, respectively. The controller component 112 can replace the personal data component 216 with the first token 316 and can replace the personal data component 224 with the second token 324 for presentation to the customer service representative 106.

The controller component 112 can detect the personal data components 216 and 224 through a variety of techniques described herein including, for example, based on knowledge of the content or type of questions 310 and 318 issued by the customer service representative 106. In various embodiments, the controller component 112 can compare the contents of the responses 212 and 220 to a keyword list, can compare the formats of any data within the responses 212 and 220 to formats used for providing sensitive information, and/or can assign likelihoods to each individual component of the responses 212 and 220. The likelihoods can be a measure of the probability a specific individual portion or word contains (e.g., text string or an audio component) contains sensitive personal information. The likelihoods can then be compared to a threshold. If the assigned likelihood exceeds the threshold, then the corresponding word or portion of the response 212 and 220 can be flagged be replaced by a token.

Figure 4:
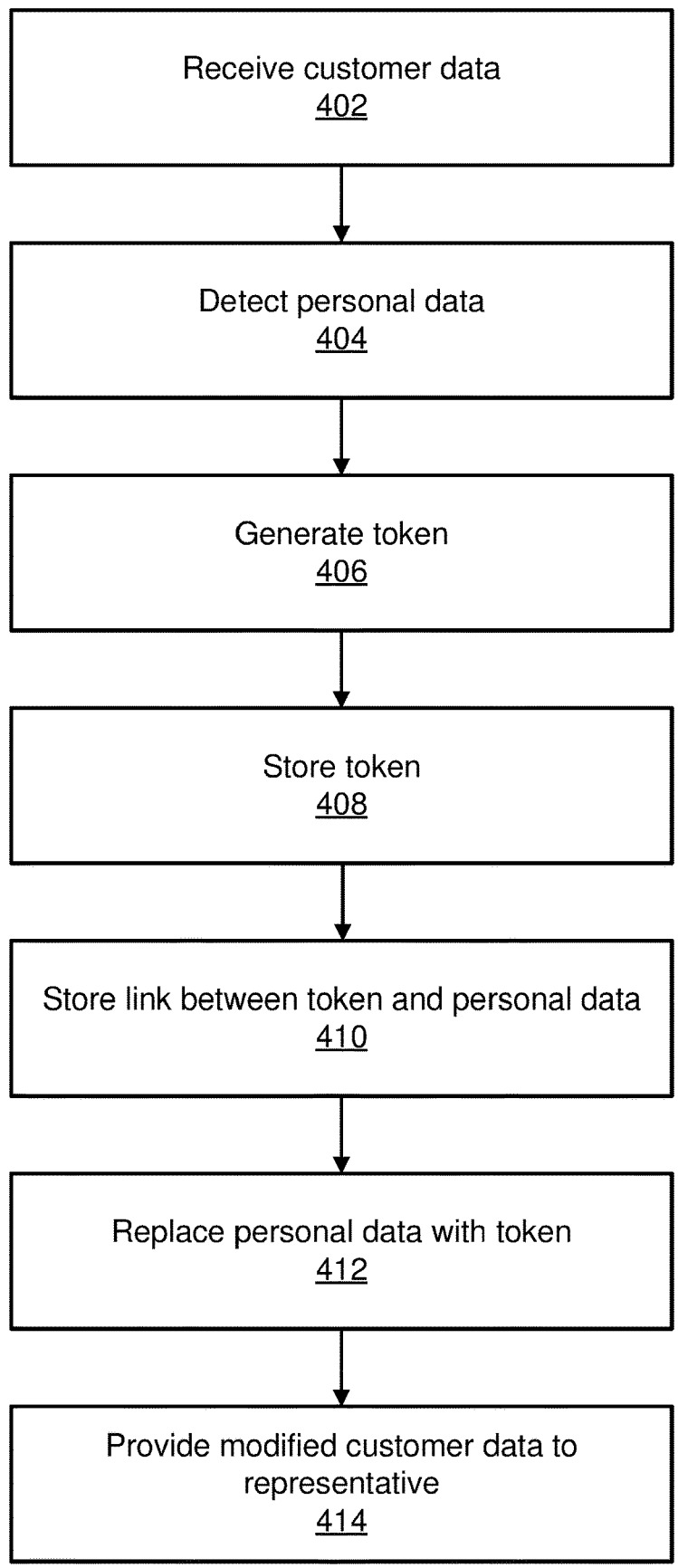
FIG. 4 illustrates a first logic flow.

FIG. 4 illustrates an example of a logic flow 400 that may be representative of a computing device providing a real-time service for protecting personal data of individuals from customer service representatives. As an example, the logic flow 400 may be representative of operations that may be performed by controller component 112, the remote system 108, and/or the storage device 114 in the operating environment 100 of FIG. 1.

At 402, the controller component 112 can receive customer data from a remote computing device. The remote computing device can be the user device 104. The customer data can include personal data indicative of sensitive information of the user 102. The customer data can be provided to the controller component 112 in response to a query from the customer service representative 106. The customer data can be provided as audio or verbal information or can be provided as data such as textual data provided through an online chat service session between the user device 104 and the remote system 108. In general, any type of data can be provided in response to a query and received at 402.

At 404, the controller component 112 can detect the personal data within the received customer data. The controller component 112 can receive the customer data and can analyze the data for the likely inclusion of sensitive personal information of the user 102. Each constituent component of the received customer data can be analyzed for containing the personal data of the user 102.

At 406, the controller component 112 can generate a token to replace the personal data within the customer message. The token can include innocuous data that does not include the sensitive information of the user 102. The token can include voice or audio data or can include textual or other data shared between computing devices. In general, the token can be any type of data.

At 408, the controller component 112 can store the generated token and the detected personal data. This information can be stored in the storage device 114.

At 410, the controller component 112 can also store data indicative of the association or relationship between the generated token and the detected personal data. The data indicating the link can be stored in the storage device 114.

At 412, the controller component can replace the detected personal data in the received customer data with the token to form modified customer data or a modified customer message. The modified customer data can match the original customer data with the exception of the generated token replacing the detected personal data.

At 414, the modified customer data can be provided to the customer service representative 106. In various embodiments, the modified customer data can be audio data provided to the customer service representative 106 as an audio signal or another audible message. In various embodiments, the modified customer data can be other data such as textual data provided to the customer service representative 106 as data (e.g., textual data) on a display associated with the remote system 108.

The stored generated token, the stored personal data, and the stored data indicating the link between the generated token and the stored personal data can be relied on and used at a later time by the controller component 112, the remote system 108, and/or any other computing device storing instances of the generated token or requesting the personal data represented by the generated token.

Figure 5:
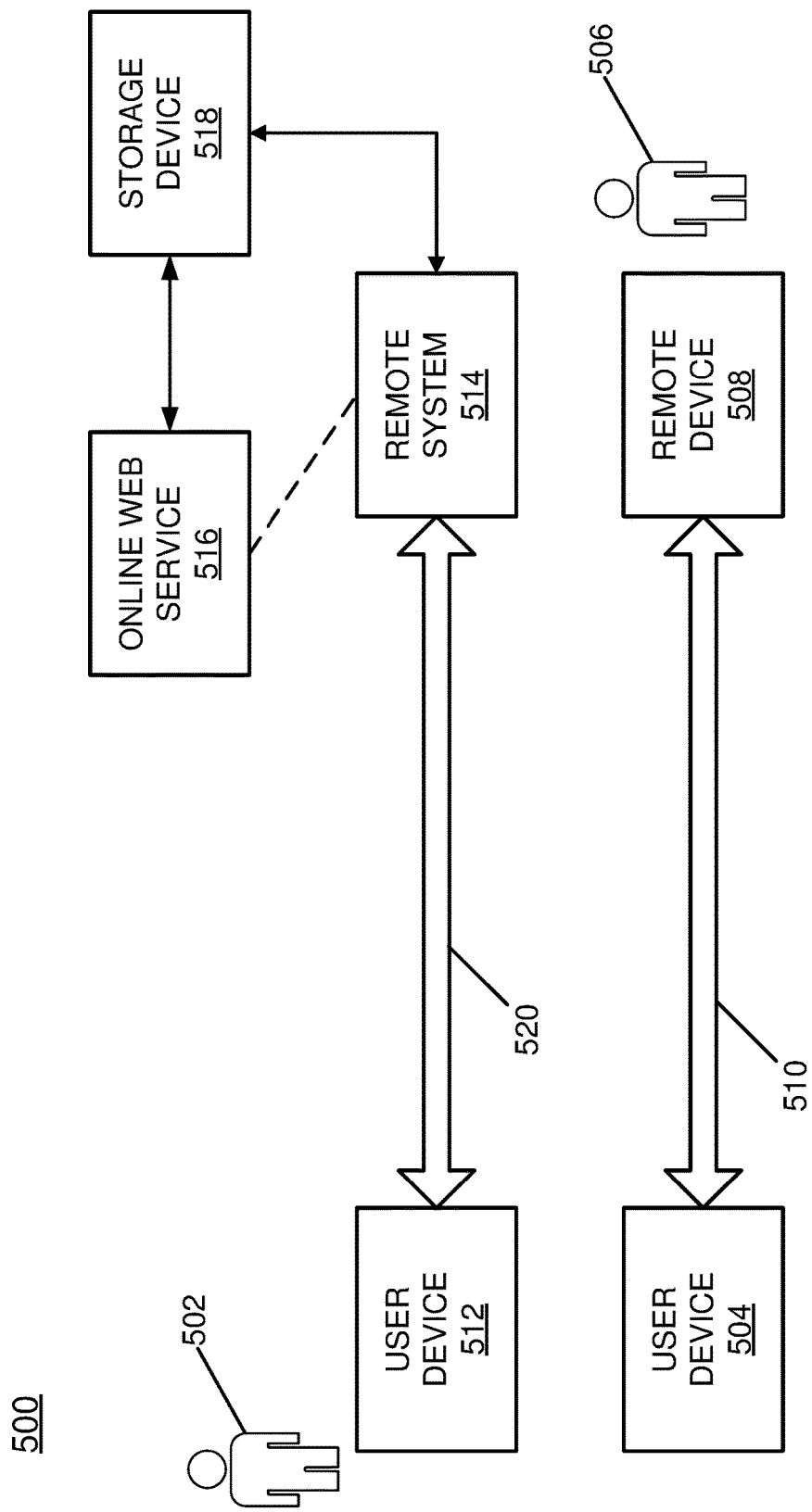
FIG. 5 illustrates a second operating environment.

FIG. 5 illustrates an operating environment 500 such as may be representative of various embodiments in which techniques for protecting client data during customer service calls may be implemented. The operating environment 100 can include a user 502 operating a first user device 504 and a remote customer service representative 506 operating a first remote device 508. The user device 504 can be any type of computing device including, for example, a desktop computer, a mobile computing device, a tablet, or a smartphone. The user device 504 can be any type of device capable of providing voice communications for the user 502 such as, for example, a landline telephone, a mobile telephone, or even a computing device.

The remote computing device 508 can be any type of computing device including a computing device operating as a web server, a host computing system, or other network management computing device. The remote computing device 508 can be any type of device capable of providing voice communications for the customer service representative 506 such as, for example, a landline phone, a mobile telephone, or any type of computing device.

In various embodiments, the user device 504 and the remote device 508 can each be a device capable of providing bi-directional voice (e.g., audio) communications with the other device such as, for example, any type of telephone device or device providing telephone or voice call capabilities. In various embodiments, the user device 504 and the remote and the remote device 508 can each be a device capable of providing chat session capabilities with the other device such as, for example, any type of computing device. Accordingly, the remote device 508 can be or can provide an online chat service capable of establishing a chat session with the user device 504. Under any scenario, the user device 504 and the remote device 508 can represent primary or initial devices for establishing communications (e.g., verbal, audio, video-chat, and/or text chat-based communications) between the user 502 and the customer service representative 506.

In various embodiments, the user device 504 and remote device 508 can communicate and/or share any data or information over a communication link 510. The communication link 510 can comprise one more computer networks or links. The communication link 510 can include, for example, one or more wireless communication systems that operate according to one or more wireless communication standards or protocols over any frequency band or range. The communication link 510 can include, for example, one or more wired communication systems that operate according to one more wired communication standards or protocols over any type of wired media. The user device 504 and the remote device 508 can communicate according to any computer network protocol including any Internet-related communication protocol and/or according to any voice communication protocol or other communication protocol to facilitate voice and/or data communications between the user device 504 and the remote device 508.

In various embodiments, initial communication between the user 502 and the customer service representative 506 can be established over the communication link 510 using the user device 504 and the remote device 508. For example, the user 502 can initiate a telephone call using the user device 504 to a service that responds to customer issues that is answered and handled by the customer service representative 506 using the remote device 508. In many situations, to verify the user 502 and/or to collect information to handle a request by the user 502, the customer service representative 506 may need to collect sensitive personal information from the user 502—for example, a Social Security number, a date of birth, or information regarding a medical condition. Often, the user 502 feels uncomfortable providing the sensitive personal information to the customer service representative 506, for example, for fear that the customer service representative 506 could possibly use or otherwise exploit the gathered sensitive personal information of the user 502.

Techniques described herein can allow the user 502 to provide sensitive personal information without exposing the sensitive personal information to the customer service representative 506. However, the sensitive personal information can be stored and used by computing devices associated with the service providing customer support to allow the needs of the user 502 to be addressed.

As further shown in FIG. 5, the operating environment 500 can also include a second user device 512 and a second remote device 514. The user device 512 can be any device capable of exchanging data with the remote device 514. In various embodiments, the user device 512 can be any type of computing device including, for example, a desktop computer, a mobile computing device, a tablet, or a smartphone. The remote computing device 514 can also be any type of device capable of exchanging data with the user device 512. In various embodiments, the remote device 514 can be any type of computing device including a computing device operating as a web server, a host computing system, or other network management computing device.

In various embodiments, the remote computing device 514 can host an online web service 516. The online web service 516 can be any type of website or application accessible over, for example, the Internet. The remote computing device 514 can respond to requests and/or inputs from the user device 512 (e.g., as received by the remote computing device 514) to present the online web service 516 and/or any of the functionality of the online web service 516 to the user device 512. In various embodiments, the online web service 516 can be, for example, a website to facilitate entry of sensitive personal information of the user 502 without the information being seen or otherwise accessible to the customer service representative 506. In various embodiments, the online web service 516 can require the user 502 to provide authentication information before being provided one or more web pages and/or data entry fields for entering the sensitive personal information.

For example, during a voice call between the user 502 and the customer service representative 506 using the user device 504 and the remote device 508, the customer service representative 506 can relay a temporary logon or session identification (ID) to the user 502. The user 502 can then provide the logon information or session ID to the online web service 516 after which the user can be prompted through the online web service 516 to enter certain sensitive personal information. The user 502 can then enter the sensitive personal information (e.g., a Social Security number) into the user device 512 to provide it to the remote device 514 and/or the online web service 516. In this way, the data indicative of the sensitive personal information is not provided to the customer service representative 506.

In various embodiments, an application or other program can be executed or provided by the user device 512 to facilitate entry of the sensitive personal information of the user 502. For example, the user device 512 can be a smartphone that includes an app that the user 512 can use to enter data indicative of the sensitive personal information. The app can then provide the information to the remote device 514. Again, logon information or a session ID may be needed to initiate the transfer of the sensitive personal information and to match the user 502 to the sensitive information being provided. Such initiation information can be provided to the user 502 verbally by the customer service representative 506 and/or can be provided to the user 502 via text message or email message for example.

Sensitive personal information provided by the user 502—either through an application provided on the user device 512 and/or through the online web service 516—can be detected and stored in a storage device 518. The storage device 518 can be any type of memory device. The storage device 518 can store the personal information without the information ever being seen, read, or otherwise accessible to the customer service representative 506.

In various embodiments, the user devices 504 and 512 can be the same device or can be separate devices. As an example, the user device 504 and 512 can be a single smartphone operated by the user 502. Under such a scenario, the user device 504 can represent the phone or voice call capabilities of the smartphone (e.g., telephone or video call features) while the user device 512 can represent app capabilities of the smartphone. As another example, the user device 504 can be a smartphone the user 502 uses to engage in a voice call with the customer service representative and the user device 512 can be a laptop or desktop computer the user 502 uses to reach the online web service 516.

Under any scenario or with any device used, the user 502 can be prompted to provide data indicative of certain sensitive personal information using the user device 512. The customer service representative 506 can prompt the user 502 for the information or can initiate a query presented to the user 502 on a display associated with or coupled to the user device 512. For example, the customer service representative 506 may be required to request the Social Security number for the user 502. Once session communications are established between the user device 512 and the remote device 514, the customer service representative 506 can perform an action that initiates the user device 512 to prompt the user 502 for her Social Security number. The prompt can be any visual or verbal information and can include a data entry field that the user 502 can use to enter her Social Security number. The provided Social Security number can be provided to the remote device 514 and to the storage device 518 for storage. One skilled in the art would appreciate how such a process for initiating a request for data from the user can be provided though the online web service 516 or through an app operating on the user device 512.

In various embodiments, the user device 512 and remote device 514 can communicate and/or share any data or information over a communication link 520. The communication link 520 can comprise one more computer networks or links. The communication link 520 can include, for example, one or more wireless communication systems that operate according to one or more wireless communication standards or protocols over any frequency band or range. The communication link 520 can include, for example, one or more wired communication systems that operate according to one more wired communication standards or protocols over any type of wired media. The user device 512 and the remote device 514 can communicate according to any computer network protocol including any Internet-related communication protocol and/or according to any voice communication protocol or other communication protocol to facilitate voice and/or data communications between the user device 512 and the remote device 514.

When sensitive personal information is provided by the user 502 and received by the remote device 514 and stored by the storage device 518, the remote device 514 can provide an indication to the customer service representative 506. For example, the remote device 514 can provide a visual indication on a display coupled to the remote device 514 that is viewable by the customer service representative 506 that indicates the prompted or requested sensitive personal information has been provided by the user 502. In various embodiments, in lieu of an indication or in addition thereto, the remote device 514 can provide replacement data or a replacement token to the customer service representative 506. For example, instead of the Social Security number of the user 502 being displayed to the customer service representative 506, the remote device 514 can display other text or data that does not include the sensitive personal information.

In various embodiments, the remote devices 508 and 514 can be separate devices or can be the same device. In various embodiments, the remote devices 508 and 514 can be a single computing device providing voice call capabilities and data manipulation capabilities. In various embodiments, the remote device 514 can be a computing device operated by the customer service representative 506 that the customer service representative 506 can use to initiate requests for sensitive personal information to the user 502. For example, the customer service representative 506 can specify a type of information request through entry with the remote device 514. In response, the remote device 514 can direct the online web service 516 to present a webpage and/or a data entry field to the user 502 on the user device 512 indicative of the request. Alternatively, the remote device 514 can transmit data to the app operating on the user device 512 to request the app to present a request for the specified information. Under either scenario, the customer service representative 506 can initiate the type of query or request and the type of information to be provided. Once the requested information is provided, the remote device 514 can indicate to the customer service representative 506 that the requested or needed information was provided by the user 502.

Figure 6:
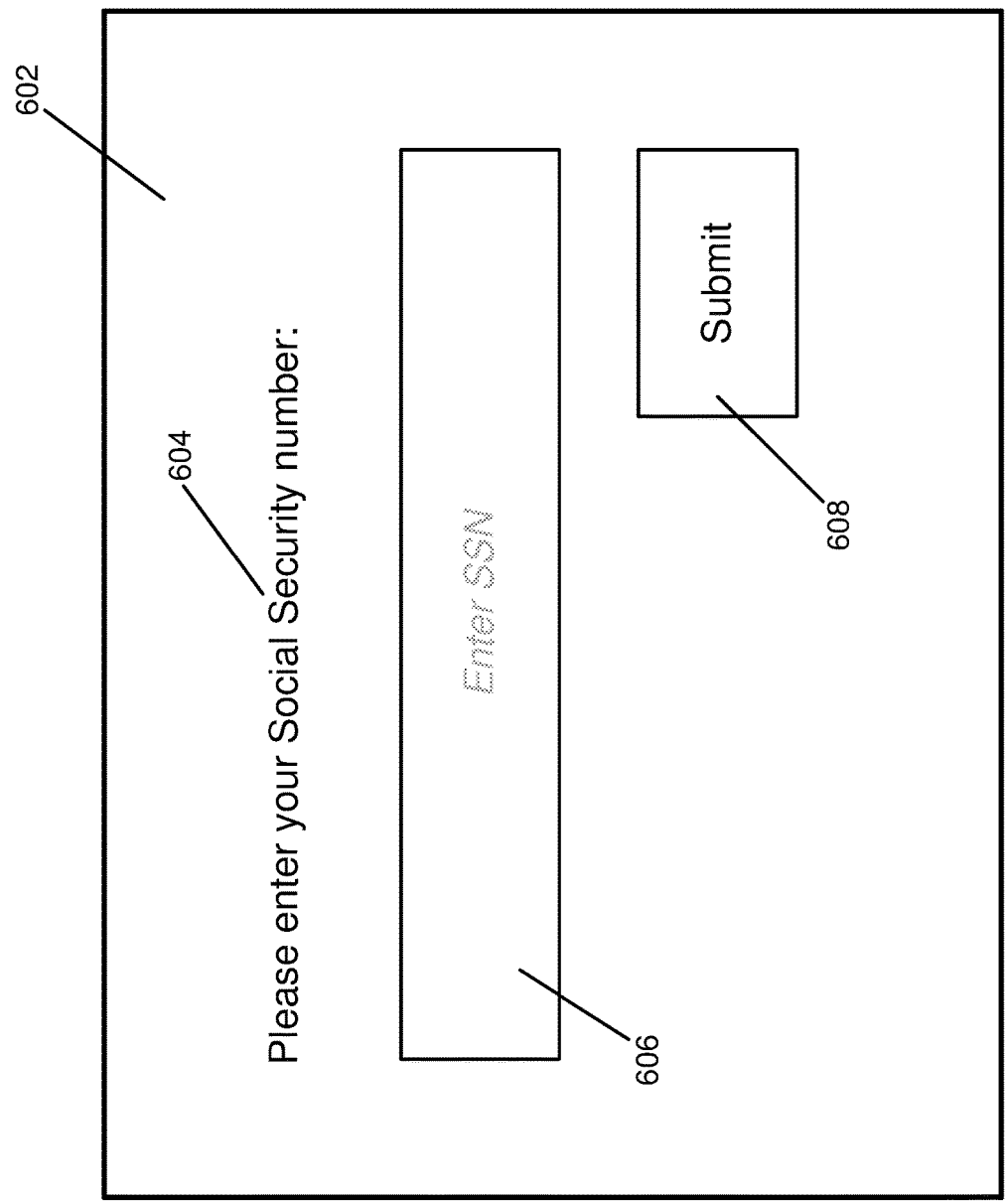
FIG. 6 illustrates a display presented to a user depicted in FIG. 5.

FIG. 6 illustrates a display 600 that can be presented to the user 502 on the user device 512. The display 600 can be provided, for example, by an app running on the user device 512 or through a web browser based on data provided by the online web service 516. The display 600 can represent an example of a request for sensitive personal information from the user 502.

As shown in FIG. 6, the display 600 can include a graphical window 602, a prompt 604, and a data entry field 606. The prompt 604 can include textual or other data indicating a request for a particular type of personal information. The data entry field 606 can be a placeholder in which the user 502 can provide the requested information. The user 502 can enter data into the data entry field 606 using a keypad or a touchscreen user interface for example.

The display 600 can be presented to the user 502 under the direction of the customer service representative 506. For example, the customer service representative 506 can select information to request from the user 502 using the remote device 514 which can then provide the display 600 to the user through the user device 512. In various embodiments, the display can include an enter field or button 608 to initiate transmission of data provided in the data entry field 606 to the remote device 514. The display 600 can represent a single display within a sequence of displays provided to the user 502 requesting a sequence of sensitive personal information. In various embodiments, the display 600 can include multiple prompts 604 and multiple corresponding data entry fields 606.

Figure 7:
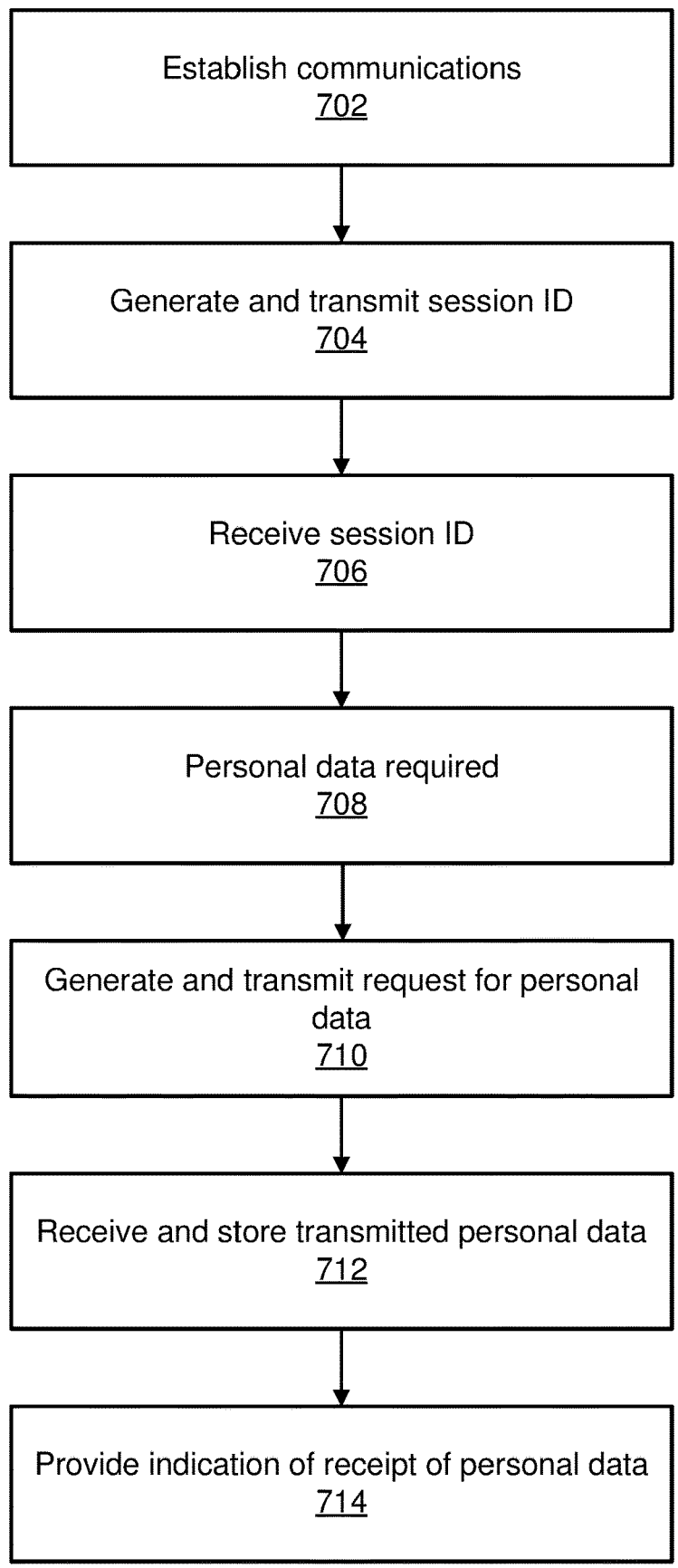
FIG. 7 illustrates a second logic flow.

FIG. 7 illustrates an example of a logic flow 700 that may be representative of a computing device or system implementing techniques for protecting client data during customer service calls. As an example, the logic flow 700 may be representative of operations that may be performed by one or more of the components depicted in the operating environment 500 of FIG. 5.

At 702, communications between the user 502 and the customer service representative 506 can be established. The communications can be established by a voice call or by a chat service session. The user 502 or the customer service representative 506 can initiate the communications. As an example, the user 502 can initiate a telephone voice call with a customer response service using the remote device 504. The remote device 504 can be a telephone or a computing device having voice call capabilities (and/or video chat capabilities). The telephone voice call placed by the user 502 can be routed and answered by the customer service representative 506. The customer service representative 506 can answer the placed call using the remote device 508. The remote device 508 can be a telephone or a computing device having voice call capabilities (and/or video chat capabilities). In various embodiments, the user device 504 and the remote device 508 can be computing devices providing a real-time or near real-time chat service session between the user 502 and the customer service representative 506.

The user and the customer service representative 506 can engage in a conversation—for example, either over a voice call or over a chat session—to address issues related to the user 502. The user 502 can be considered to be a client or a customer. During the interaction between the user 502 and the customer service representative 506, it may become necessary to have the user 502 provide sensitive personal information.

At 704, a computing device used by the customer service representative 506 or another computing device coupled to a computing device used by the customer service representative 506 (e.g., part of the same network) can generate a session ID or other data to uniquely identify the user 502 and/or the current interaction between the user 502 and the customer service representative 506. The session ID can comprise any data or information such as, for example, a code including any textual, numerical, and/or special character data. In various embodiments, the remote device 514 can generate the session ID or can receive the session ID from another computing device. The remote device 514 can transmit the session ID to the user device 512. In various embodiments, the session ID can be provided to the user 502 as an email message or text message. In various embodiments, the session ID can be verbally provided to the user 502 by the customer service representative 506.

At 706, the user 502 can receive the session ID. As described herein, the session ID can be received in a number of manners from the remote device 514. The user 502 can enter the session ID into the remote device 512 for transmission to the remote device 514. The user 502 can interact with an application on the user device 512 and/or a website provided by the online web service 516 to input and transmit the session ID. The session ID can be received by the remote device 514 and can be used to verify the user 502 and/or to establish a secondary communications link between the user 502 and the remote device 514 in order to facilitate protection of sensitive personal information from the user 502.

Once the session ID has been provided by the user 502 and received and processed by the remote device 514, further data provided by the user through the user device 512—either through an app running on the user device 512 and/or through a website provided by the online web service 516—for transmission to the remote device 514 can be identified as data provided by the user 502 and also identified as containing sensitive personal information.

At 708, after further interaction between the user 502 and the customer service representative 506, a point may be reached during the interaction that sensitive personal information from the user 502 may be needed. The customer service representative 506 can alert the user 502 of the need for the sensitive personal information.

At 710, the remote device 514 can transmit a request or prompt for the sensitive personal information. The remote device 514 can transmit the request through the online web service 516 or by transmitting the request to the application provided by the user device 512. In response, a display of the user device 512—either through the application or remote website—can present the user 502 with a request for specific information as well as a data entry field for entering the requested information. The user 502 can enter the requested information into the provided data entry field and then request transmission of the sensitive personal information to the remote device 514.

At 712, the remote device 514 can receive the sensitive personal information provided by the user. The remote device 514 can store the sensitive personal information in the storage device 518. The remote device 514—even when operated or otherwise accessible by the customer service representative 506—can prevent the received sensitive personal information from being provided, seen, or otherwise accessed by the customer service representative 506.

At 714, the remote device 514 can provide an indication to the customer service representative 506 that the requested sensitive information has been received and stored. Any type of indication can be provided including, for example, replacement data or placeholder data that does not include the sensitive personal information. The stored personal information can be used to perform a number of actions including, for example, verifying a user or collecting information necessary to address an issue from the user 502. The sensitive personal information can be shared among different computing devices as needed to facilitate operations related to servicing the user 502 without ever providing the information to a human customer service representative. In this way, sensitive personal information can be provided by the user 502 to facilitate a customer response service to address an issue from the user 502 without the sensitive personal information being provided to the customer service representative 506.

Figure 8:
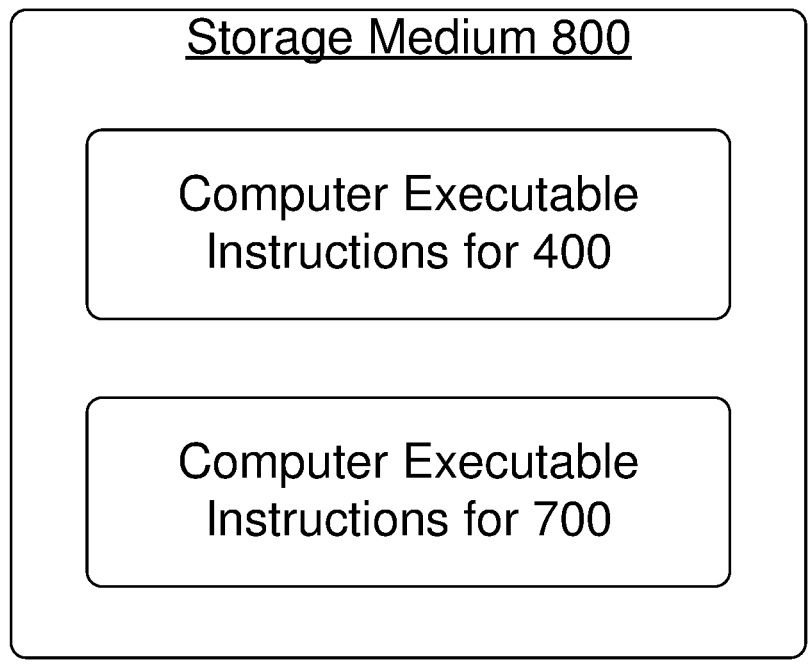
FIG. 8 illustrates a storage medium.

FIG. 8 illustrates a storage medium 800. Storage medium 800 may represent an implementation of the storage device 114 or the storage device 518. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as the logic flow 400 of FIG. 4 and/or the logic flow 700 of FIG. 7. In various embodiments, storage medium 800 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 9:
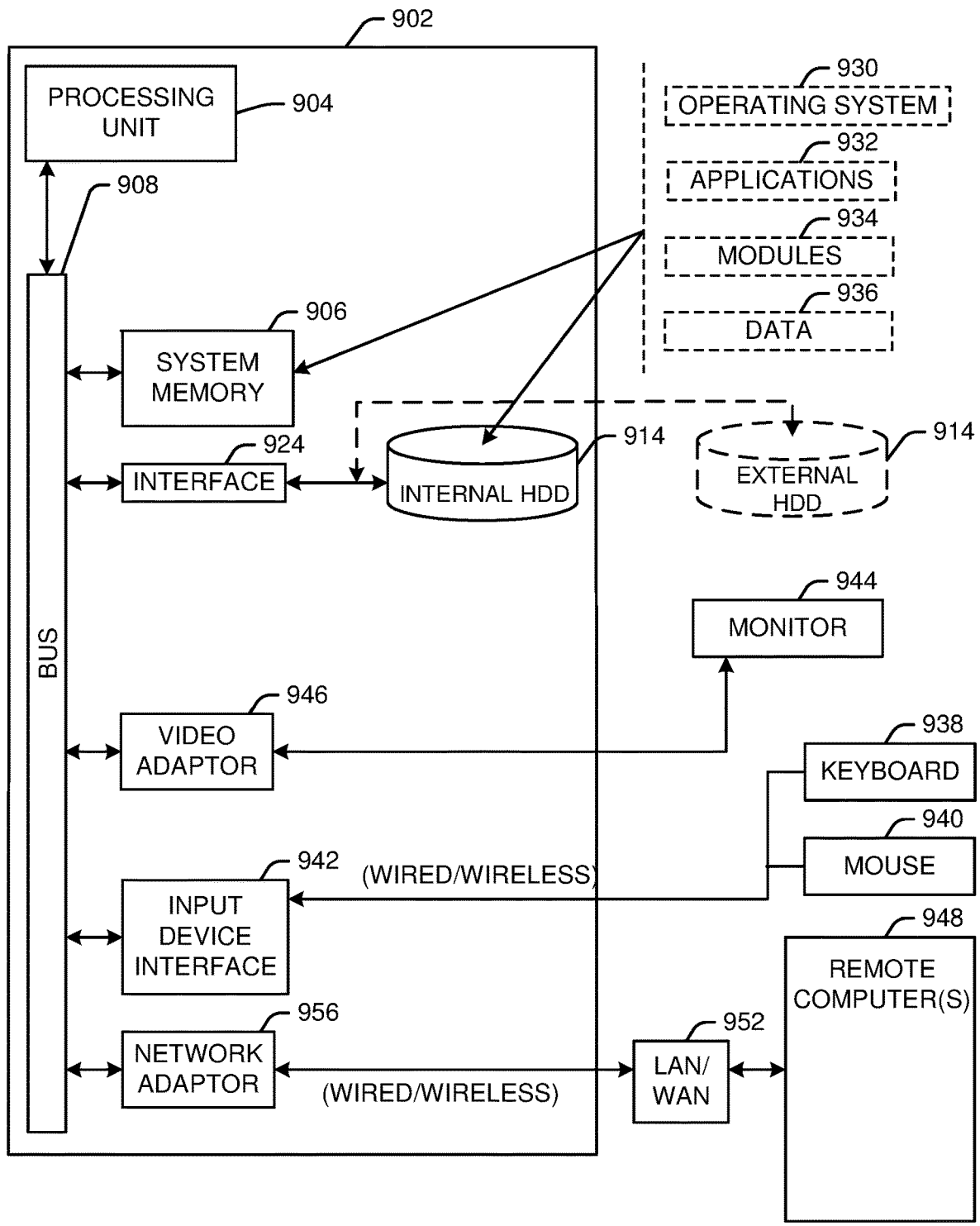
FIG. 9 illustrates a computing architecture.

FIG. 9 illustrates a computing architecture 900 that can implement various embodiments described herein. In various embodiments, the computing architecture 900 can comprise or be implemented as part of an electronic device. In various embodiments, the computing architecture 900 can represent an implementation of the device 104, the device 504, or the device 512. In various embodiments, the computing architecture 900 can represent an implementation of the remote computing device or system 108 for providing a real-time service for protecting personal data of individuals from customer service representatives. In various embodiments, the computing architecture 900 can represent an implementation of the remote device 508, remote device 514, or online service 516 operating to protect client data during customer service calls.

The computing architecture 900 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures.

The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924.

In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

Figure 10:
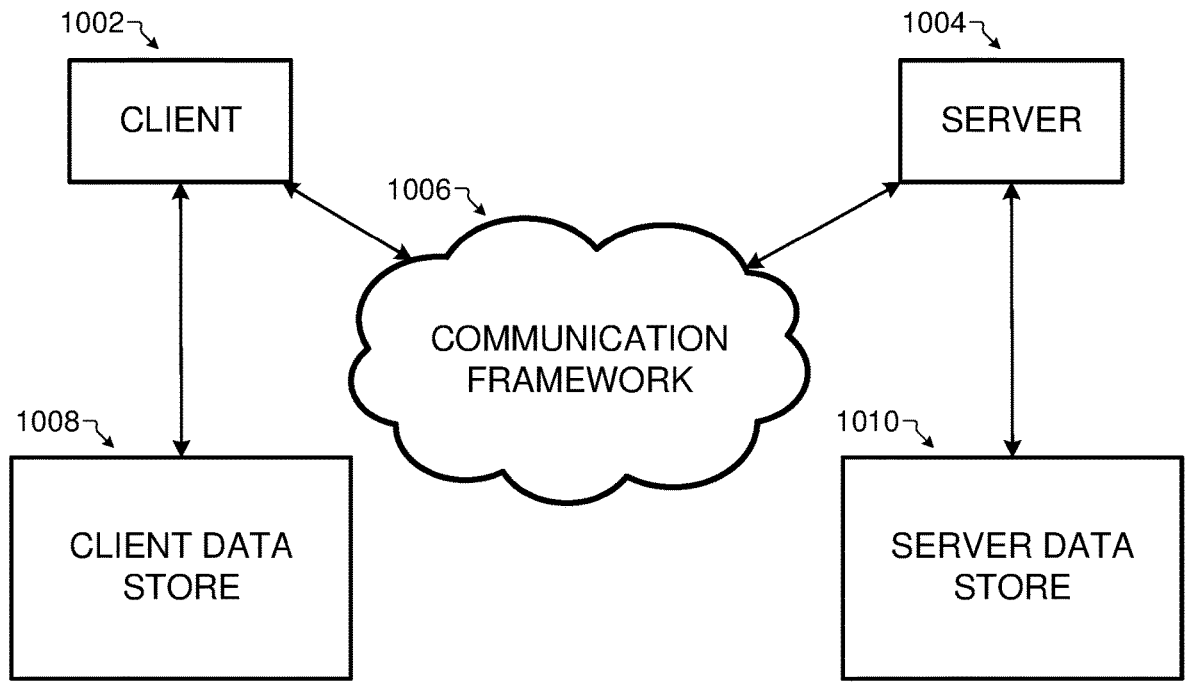
FIG. 10 illustrates a communication architecture.

FIG. 10 illustrates a block diagram of a communication architecture 1000. The communication architecture 1000 can implement various embodiments described herein. As shown in FIG. 10, the communication architecture 1000 comprises one or more clients 1002 and servers 1004. One of the clients 1002 can represent an implementation of the user device 104, user device 504, and/or the user device 512. One of the servers 1004 can represent an implementation of the remote system 108, remote device 508, remote device 514, and/or the online web service 516.

The client 1002 and the server 1004 can be operatively connected to a client data store 1008 and a server data store 1010, respectively, that can be employed to store information local to the respective client 1002 and server 1004. In various embodiments, the server 1004 can implement one or more of logic flows or operations described herein and/or any of the functions and features described in relation to any of the remote devices described herein.

The client 1002 and the server 1004 can communicate data or other information between each other using a communication framework 1006. The communications framework 1006 can implement any known communications technique or protocol. The communications framework 1006 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1006 can operate over any communication media according to any networking technology including any wired or wireless communications standard or protocol, or any combination thereof.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An apparatus, comprising:
   a storage device to store personal data linked with a token, the personal data indicative of sensitive personal information of a customer; and
   logic, at least a portion of which is implemented in circuitry coupled to the storage device, the logic to:
      receive a communication over a networking connection from a computing device, the communication comprising sensitive data;
      generate replacement data for the sensitive data;
      store the replacement data in the storage device, the replacement data linked with the sensitive data in the storage device; and
      provide the replacement data on a display to a user, and the logic configured to retrieve and use the sensitive data when the replacement data is entered in a data entry field to perform an operation.

2. The apparatus of claim 1, wherein the communication is a voice communication comprising verbal data, and the logic to detect the sensitive data in the verbal data.

3. The apparatus of claim 1, wherein the communication is a data communication comprising non-verbal data, and the logic to detect the sensitive data in the non-verbal data.

4. The apparatus of claim 1, wherein the replacement data is stored with an identifier to link the replacement data with the sensitive data in the storage device.

5. The apparatus of claim 1, wherein the replacement data and the sensitive data comprise different alpha-numeric characters.

6. The apparatus of claim 1, wherein the communication is a voice communication and the replacement data is verbal data.

7. The apparatus of claim 1, wherein the communication is a non-verbal communication and the replacement data is non-verbal data.

8. The apparatus of claim 1, the logic to:
   receive the replacement data via the data entry field; and
   retrieve the sensitive data from the storage device to perform the operation, the sensitive data determined based on the link between the replacement data and the sensitive data.

9. The apparatus of claim 8, the logic to perform the operation with the sensitive data without exposing the sensitive data to the user.

10. The apparatus of claim 1, wherein the sensitive data is detected within the communication utilizing text recognition techniques, a speech recognition technique, and/or a machine-learning technique.

11. A computer-implemented method, comprising:
    receiving a communication over a networking connection from a computing device, the communication comprising sensitive data;
    generating replacement data for the sensitive data;
    storing the replacement data in a storage device, the replacement data linked with the sensitive data in the storage device;
    causing the replacement data to display on a display to a user; and
    receiving the replacement data to perform an operation.

12. The computer-implemented method of claim 11, wherein the communication is a voice communication comprising verbal data, and the computer-implemented method further comprises detecting the sensitive data in the verbal data.

13. The computer-implemented method of claim 11, wherein the communication is a data communication comprising non-verbal data, and the computer-implemented method further comprises detecting the sensitive data in the non-verbal data.

14. The computer-implemented method of claim 11, wherein the replacement data is stored with an identifier to link the replacement data with the sensitive data in the storage device.

15. The computer-implemented method of claim 11, wherein the replacement data and the sensitive data comprise different alpha-numeric characters.

16. The computer-implemented method of claim 11, wherein the communication is a voice communication and the replacement data is verbal data.

17. The computer-implemented method of claim 11, wherein the communication is a non-verbal communication and the replacement data is non-verbal data.

18. The computer-implemented method of claim 11, comprising:

receiving the replacement data via a data entry field to perform the operation; and retrieving the sensitive data from the storage device to perform the operation, the sensitive data determined based on the link between the replacement data and the sensitive data.

19. The computer-implemented method of claim 18, comprising performing the operation with the sensitive data without exposing the sensitive data to the user.

20. The computer-implemented method of claim 19, wherein the sensitive data is detected within the communication utilizing text recognition techniques, a speech recognition technique, and/or a machine-learning technique.

* * * * *